US012385296B2

(12) United States Patent
Drost et al.

(10) Patent No.: US 12,385,296 B2
(45) Date of Patent: Aug. 12, 2025

(54) MOTOR VEHICLE LOCK, IN PARTICULAR A MOTOR VEHICLE BONNET LOCK

(71) Applicant: Kiekert AG, Heiligenhaus (DE)

(72) Inventors: Bernhard Drost, Isselburg (DE); Christian Sturm, Krefeld (DE)

(73) Assignee: Kiekert AG, Heiligenhaus (DE)

( * ) Notice: Subject to any disclaimer, the term of this patent is extended or adjusted under 35 U.S.C. 154(b) by 335 days.

(21) Appl. No.: 17/620,174

(22) PCT Filed: May 15, 2020

(86) PCT No.: PCT/DE2020/100423
§ 371 (c)(1),
(2) Date: Feb. 25, 2022

(87) PCT Pub. No.: WO2020/259739
PCT Pub. Date: Dec. 30, 2020

(65) Prior Publication Data
US 2022/0364397 A1 Nov. 17, 2022

(30) Foreign Application Priority Data
Jun. 24, 2019 (DE) ..................... 10 2019 116 878.3

(51) Int. Cl.
*E05B 81/06* (2014.01)
*E05B 77/54* (2014.01)
(Continued)

(52) U.S. Cl.
CPC .............. *E05B 83/24* (2013.01); *E05B 77/54* (2013.01); *E05B 81/06* (2013.01); *E05B 81/14* (2013.01); *E05B 81/56* (2013.01); *E05B 81/72* (2013.01)

(58) Field of Classification Search
CPC .......... E05B 83/24; E05B 83/26; E05B 77/54; E05B 81/06; E05B 81/14; E05B 81/56; E05B 81/72
See application file for complete search history.

(56) References Cited

U.S. PATENT DOCUMENTS 10,378,252 B2 * 8/2019 Ottino .................... E05B 81/68
10,988,961 B2 * 4/2021 Krause ................. E05B 85/045
(Continued)

FOREIGN PATENT DOCUMENTS

DE 102010061518 A1 4/2012
DE 102015116775 A1 * 4/2017 ............ E05B 63/24
(Continued)

OTHER PUBLICATIONS

International Search Report mailed Sep. 23, 2020, for priority International Patent Application No. PCT/DE2020/100423.

*Primary Examiner* — Kristina R Fulton
*Assistant Examiner* — Thomas L Neubauer
(74) *Attorney, Agent, or Firm* — Renner, Otto, Boisselle & Sklar, LLP

(57) ABSTRACT

A motor vehicle lock, in particular a motor vehicle bonnet lock. Same is designed with a locking mechanism substantially formed by a rotatory latch and a pawl for cooperating with a locking bolt. In addition, a catch hook is provided for independent and additional securing of a locking bolt. The locking mechanism is provided with a locking mechanism drive and the catch hook is provided with a catch hook drive. According to the invention, the locking mechanism drive and the catch hook drive are optionally actuated by motor vehicle signals.

5 Claims, 2 Drawing Sheets

(51) Int. Cl.

| | |
|---|---|
| ***E05B 81/14*** | (2014.01) |
| ***E05B 81/56*** | (2014.01) |
| ***E05B 81/72*** | (2014.01) |
| ***E05B 83/24*** | (2014.01) |

(56) References Cited

U.S. PATENT DOCUMENTS

| | | | | |
|---|---|---|---|---|
| 2014/0088826 | A1 | 3/2014 | Wheeler et al. | |
| 2017/0058575 | A1 | 3/2017 | Farooq et al. | |
| 2019/0024416 | A1 | 1/2019 | Linden et al. | |
| 2019/0292818 | A1* | 9/2019 | Cumbo .................. | E05B 81/77 |

FOREIGN PATENT DOCUMENTS

| | | | |
|---|---|---|---|
| DE | 202017100895 | U1 | 7/2017 |
| DE | 102017102813 | A1 | 8/2018 |
| DE | 102017108266 | A1 | 10/2018 |
| GB | 2562271 | A | 11/2018 |

* cited by examiner

MOTOR VEHICLE LOCK, IN PARTICULAR A MOTOR VEHICLE BONNET LOCK

This application is a national phase of International Application No. PCT/DE2020/100423 filed May 15, 2020, which claims priority to German Application No. 10 2019 116 878.3 filed Jun. 24, 2019, the entire disclosures of which are hereby incorporated by reference.

FIELD OF DISCLOSURE

The invention relates to a motor vehicle lock, in particular a motor vehicle hood lock, with a locking mechanism consisting of the essential rotary latch and pawl for interaction with a locking bolt, and with a catch hook for independent and additional securing of the locking bolt, wherein the locking mechanism is equipped with a lock mechanism drive, and the catch hook is equipped with a catch hook drive.

BACKGROUND OF DISCLOSURE

For safety reasons, motor vehicle locks, and in particular motor vehicle hood locks have, in addition to the actual locking mechanism for securing the locking bolt, the additional catch hook, with the assistance of which the locking bolt can be secured independently of the locking mechanism. In fact, for example, when the front hood is not correctly closed, there is a danger that it can swing upward out of a pre-locking position from the oncoming airstream and entirely cover the vision of a vehicle driver. This is dangerous and can cause accidents. So that this does not or cannot occur, the catch hook offers the described additional securing of the locking bolt. Generally, after the locking mechanism has been previously opened, the catch hook is manually swung away by a vehicle user in order to be able to open the relevant hood, or front hood.

A motor vehicle lock, and in particular a front cover lock or front hood lock is described in DE 10 2010 061 518 A1. In this case, the catch hook is equipped with a control edge and a latching edge. Moreover, the catch hook is securely connected to the rotary latch. In this manner, an overall improvement in terms of lock technology is achieved.

In DE 10 2017 102 813 A1 by the applicant, the hood lock realized therein is additionally equipped with a raising device for the locking bolt. Moreover, there is at least one adjusting spring that contacts the opening device, as well as a sensor for sensing the position of the hood. An additionally provided additional spring ensures that when the adjusting spring fails and/or malfunctions, the hood is raised. In this manner, overall flawless position querying of the hood is provided with the help of the sensor.

In the generic prior art according to 10 2017 108 266 A1, a locking mechanism drive and a catch hook drive are realized in the form of actuators or microdrives. With the assistance of the locking mechanism drive, the pawl the locking mechanism can be lifted from its engagement with the rotary latch. The catch hook drive ensures that the lock hook releases the locking bolt. Normally, a spring contacts the catch hook so that the catch hook drive ensures the opening of the catch hook and the release of the locking bolt against the force of the spring.

The prior art, in particular according to the generic DE 10 2017 108 266 A1, has proven very successful in realizing a comfortable opening of the motor vehicle hood lock. Such a requirement arises in particular in the instance in which the associated motor vehicle hood, and in particular motor vehicle front hood, is used to lock a luggage compartment provided in the front of the motor vehicle. The front hood can then be easily opened electrically from the vehicle interior with the assistance of the locking mechanism drive. Mechanically operated Bowden cables or control rods frequently provided in the past at this location can then be expressly omitted.

SUMMARY OF DISCLOSURE

However, with luggage compartments closed with such a hood in the front, or the rear, or wherever on the motor vehicle, the problem arises that the relevant luggage compartment must be able to allow people accidentally locked in to open from the interior. Such an opening of the motor vehicle hood lock from the interior is especially problematic when the vehicle is moving. Then, as in the above referenced prior art, the danger exists that, in the case of a front hood, the associated hood swings upward in an uncontrolled manner, and blocks the visibility of the vehicle driver with the described negative consequences. In this case, the invention seeks an overall remedy.

The invention is based on the technical problem of further developing such a motor vehicle lock, and in particular a motor vehicle hood lock, such that enhanced safety requirements are met, and in particular people locked in the luggage compartment can get out without endangering their own health or that of vehicle passengers.

To solve this technical problem, a generic motor vehicle lock, and in particular a motor vehicle hood lock, is characterized in the context of the invention such that the locking mechanism drive and the catch hook drive are optionally actuated according to motor vehicle signals.

The locking mechanism drive and the catch hook drive can for example operate pneumatically. Generally, however, both the locking mechanism drive as well as the catch hook drive are both electromotive actuators that are used in principle and proven in the motor vehicle sector. To this end, the particular electromotive drive has at least one electric motor and an additional actuator. With the assistance of the actuator, the locking mechanism, or also the catch hook, can be actuated to open. Of course other actuations of the locking mechanism, or respectively the catch hook with the associated drive are also possible.

The aforementioned motor vehicle signals are for example a motor vehicle speed, an opening signal in the motor vehicle interior, an opening signal in the motor vehicle luggage compartment, a motor vehicle braking signal, a motor vehicle tilt signal, etc. That is, according to the invention, first at least one of these aforementioned motor vehicle signals are evaluated. Depending on the evaluation of this motor vehicle signal, the catch hook drive, the locking mechanism, or both are actuated.

If the motor vehicle is idling and the motor vehicle speed is therefore below a threshold value of for example walking speed (5 to 6 km/h), the associated motor vehicle signal is evaluated in such an instance so that both the locking mechanism drive as well as the catch hook drive are each actuated in an opening direction so that the associated hood can be swung up or open.

Generally, an opening signal in the motor vehicle interior or also in the motor vehicle luggage compartment is also evaluated in this context. That is, once such an opening signal is observed and detected, it causes, in conjunction with the queried motor vehicles speed, and when the vehicle is standing or almost standing, both the locking mechanism as well as the catch hook to open so that, as a consequence thereof, the associated hood can be swung upward. In this context, it is also possible and conceivable to evaluate a motor vehicle braking signal. In this case, an opening of the hood is only permissible in the instance in which the motor vehicle is additionally braked.

In this context, the invention takes into account the fact that, for example, the motor vehicle can roll away when on an incline when the engine is shut off and there is therefore no motor vehicle speed signal, which in any event should prevent opening. The motor vehicle brake signal may be evaluated for this purpose. In general, such a functional state is, however, represented by the fact that, when there is no motor vehicle speed signal, opening is impossible in any event.

Moreover, a motor vehicle tilt signal can also be evaluated alternatively or in addition. At this juncture, the invention takes the situation into account that the opening of a hood of the motor vehicle is not permitted for example in an inclined state to prevent the hood from abruptly swinging up. In this case, it is possible to open only the locking mechanism and contrastingly to keep holding the catch hook in engagement with the locking bolt to prevent the hood from abruptly opening due to the inclined position of the motor vehicle. In any case, one or more motor vehicle signals can be advantageously evaluated and, depending on their nature, can ensure that the locking mechanism drive by itself, the catch hook drive together with the locking mechanism drive, or none of the drives are actuated. In this context, sole actuation of the catch hook drive is generally impossible in any case, or is excluded for reasons of safety. That is, the catch hook drive is either opened together or after the latching mechanism drive is opened, or remains in its position catching the locking bolt for safety reasons.

In order to represent these different functional positions, a control unit is provided to activate the relevant drive. Moreover, the control unit evaluates one or more of the above-described motor vehicle signals.

In addition to the control unit, and of particular importance for the invention, an independent safety unit is also realized that is provided and designed to control at least one catch hook drive. That is, for its part and advantageously in the context of the invention, the safety unit ensures that only the catch hook drive is controlled with its assistance.

In this context, the design is further such that the safety unit is downstream from the control unit. Moreover, the safety unit and the control unit simultaneously process the one or more motor vehicle signals.

Depending on the relevant motor vehicle signal, the safety unit controls the catch hook drive to electrically open the catch hook. Alternatively to this, the safety unit ensures that an electrical supply line of the catch hook drive is galvanically isolated. In this case, the safety unit ensures that the catch hook cannot be opened. Due to the galvanic isolation of the electric supply line of the catch hook drive realized with the assistance of the safety unit, safety is enormously increased because the galvanic isolation of the electrical supply line is retained independent of whether or not the control unit controls the safety unit, or respectively the catch hook drive.

That is, the safety unit prioritizes the actuation of the catch hook drive over the control unit. Expressed otherwise, signals from the safety unit to the catch hook drive hierarchically take precedence over any signals from the control unit for actuating the catch hook drive, so that only the safety unit provides the decisive actuation of the catch hook drive.

The catch hook drive itself can be configured to open the catch hook in addition to its mechanical blocking. Such mechanical blocking of the catch hook is usually performed in the absence of a release signal from the safety unit. The mechanical blocking can be configured alternatively or even in addition to the galvanic isolation of the electric supply line of the catch hook drive. That is, as long as the release signal from the safety unit is absent, either the electric supply line of the catch hook drive is galvanically isolated, or ensures the mechanical blocking of the catch hook by the catch hook drive. In both cases, the invention ensures that the catch hook retains its position catching and securing the locking bolt in all circumstances. This even allows malfunctions of the control unit to be caught and managed because the safety unit takes priority over the control unit for actuating the catch hook drive.

The catch hook drive can be equipped with an additional block drive to mechanically block the catch hook when there is no release signal. It is however also possible to design the catch hook drive such that it is configured to both open the catch hook as well as to mechanically block it, and ensures this when there is no release signal.

The locking mechanism drive is in contrast generally only configured to open the locking mechanism. For this, the locking mechanism drive acts on the pawl so that it is lifted off of the rotary latch. As a consequence thereof, the locking bolt is released from the locking mechanism. However, completely opening the hood now requires that the catch hook is additionally opened, or the locking bolt is released. This is only possible according to the motor vehicle signals as described in detail above.

As a result, overall increased safety requirements for the actuation of the associated hood are satisfied. This is because malfunctions, for example of the control unit or also of the locking mechanism, never result in the opening of the catch hook while the vehicle is moving, or depending on the previously discussed motor vehicle signals. The additional safety unit or the safety module can be realized with simple means. Before the catch hook is opened, the motor vehicle signal to be checked is checked redundantly both by the control unit as well as by the safety unit. The safety unit and the control unit simultaneously process the motor vehicle signal(s). If there is anything unusual, the safety unit continues blocking the catch hook. In this manner, a significant gain in safety is observed compared to previous solutions. This is where the essential advantages are revealed.

BRIEF DESCRIPTION OF DRAWINGS

In the following, the invention is explained in greater detail with reference to a drawing showing just one example of an embodiment.

DETAILED DESCRIPTION

Figure 1:
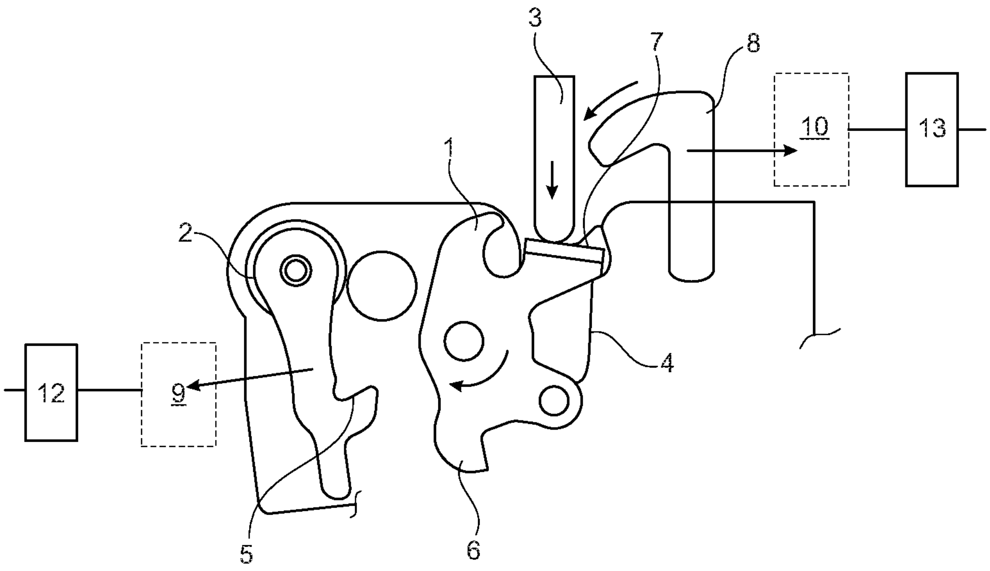
FIG. 1 shows the motor vehicle lock according to the invention in the form of a motor vehicle hood lock reduced to the essential components in its basic features.

FIG. 1 shows a motor vehicle lock in the form of a motor vehicle hood lock. In FIG. 1, it can be seen that the motor vehicle lock or the motor vehicle hood lock is equipped with a lock case in which a locking mechanism 1,2 consisting of a rotary latch 1 and a pawl 2 are rotatably mounted. The locking mechanism 1, 2 interacts with a lock holder, or respectively a locking bolt 3 of the lock holder. An additional ejector, which is not shown, may ensure that the locking bolt 3 is actuated in the opposite direction to the closing direction indicated by an arrow in FIG. 1 after an opening process.

Once the locking bolt 3 moves into an inlet opening 4 in the lock case in the closing direction shown in FIG. 1, the rotary latch 1 is swung in the clockwise direction indicated in FIG. 1, so that the pawl 2 can, with a hook-shaped contour 5, grasp behind an extension 6 of the rotary latch 1 in a latching manner in the then achieved closed state of the latch 1,2. This moves the locking bolt 3 against a stop surface 7 of the rotary latch 1.

In the closed position of the shown motor vehicle lock or hood lock, the locking bolt 3 is additionally secured with the assistance of a catch hook 8 which is actuated for this purpose in the indicated counterclockwise direction about its axis with the assistance of a spring (not shown), and secures the locking bolt 3 in addition to the rotary latch 1. Within the scope of the exemplary embodiment, the locking mechanism 1, 2 now has an electromotive locking mechanism drive 9, and an electromotive catch hook drive 10 is also realized.

Figure 2:
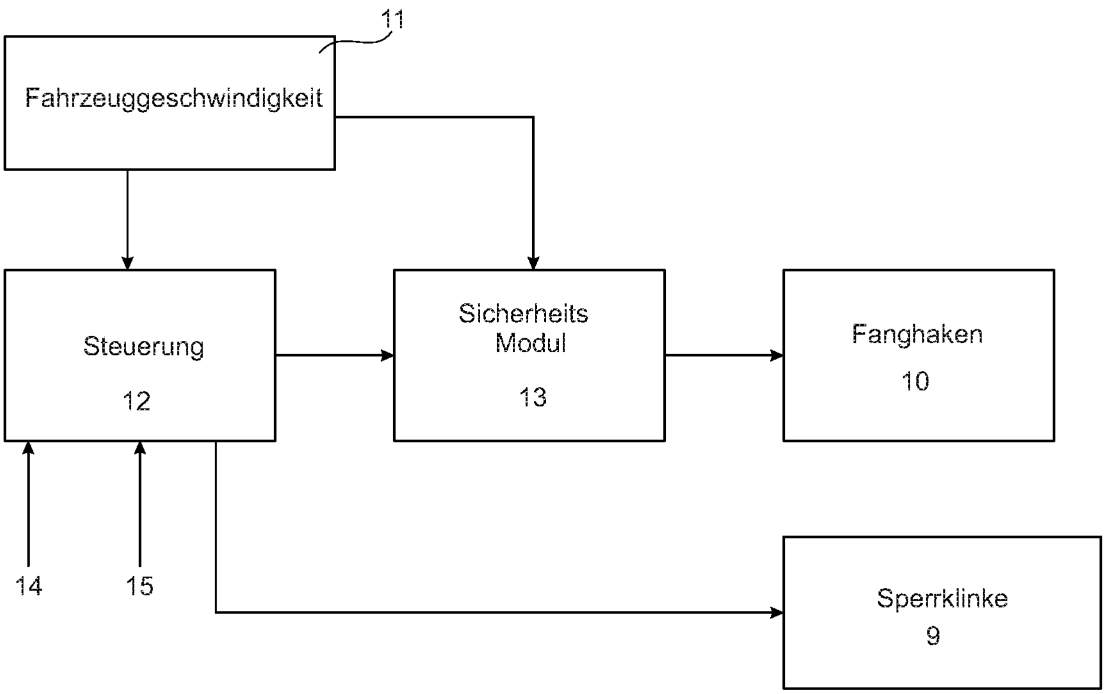
FIG. 2 shows the circuitry for activating the motor vehicle lock, or motor vehicle hood lock according to FIG. 1.

With reference to a comparative consideration of FIGS. 1 and 2, it can be seen that the locking mechanism drive 9 and the catch hook drive 10 are selectively actuated in accordance with motor vehicle signals 11. According to the exemplary embodiment, the motor vehicle signals 11 are for example the motor vehicle speed, which is below a limit speed of, for example, 5 to 6 km/h. Only then is the motor vehicle speed or the relevant motor vehicle signal 11 evaluated by a control unit 12 or a safety unit 13 such that control of the relevant drive 9, 10 is permitted at all.

In fact, it can be seen in the schematic representation of the realization of the circuitry according to FIG. 2 that, in addition to the control unit 12, the safety unit 13 is also realized, with the assistance of which at least the catch hook drive 10 is controlled. Moreover, an opening signal 14 can also be seen in FIG. 2 that can be generated from the vehicle interior by a vehicle user. Furthermore, another opening signal 15 can be generated inside a luggage compartment closed with the assistance of a hood bearing the locking bolt 3, for example by a person located there.

With reference to the circuit overview according to FIG. 2, it can be seen that the safety unit 13 is designed independently of the control unit 12 and, according to the exemplary embodiment, only serves and is used to control the catch hook drive 10. Moreover, the safety unit 13 is downstream from the control unit 12. Both the safety unit 13 as well as the control unit 12 can simultaneously process the motor vehicle signals 11. Finally, the design is such that the safety unit 13 actuates the catch hook drive 10 with priority over the control unit 12. That is, any controls or enable signals from the safety unit 13 for the catch hook drive 10 take precedence, so that additional signals from the control unit 12 may be or can be ignored in certain circumstances.

The overall design is as follows. In order to open the hood equipped with the closing bolt 3, an opening signal 14, 15 must first be present. One of the two opening signals 14, 15 are sufficient for this. The relevant opening signal 14, 15 is evaluated and detected by the control unit 12. In addition, the control unit 12 in the exemplary embodiment evaluates the vehicle speed 11. If the vehicle speed 11 is below the aforementioned limit value, the control unit 12 sends a signal to the locking mechanism drive 9. To open the locking mechanism 1, 2, the locking mechanism drive 9 acts on the pawl 2 and ensures, corresponding to the direction of the arrow indicated in FIG. 1, that the pawl 2 is lifted from its engagement with the rotary latch 1 into the closed position of the locking mechanism 1, 2. As a result, the hook or the hook-shaped contour 5 on the pawl 2 comes free from the extension 6 of the rotary latch 1 so that the rotary latch 1 swings open sufficiently for the locking bolt 3 to move upwards against the closing direction marked in FIG. 1. As before, the catch book 8 still remains engaged with the locking bolt 3, however.

The catch hook drive 10 can now be controlled in turn and indirectly via the safety unit 13. For this purpose, the motor vehicle signal 11 is redundantly checked by both the control unit 12 as well as by the safety unit 13. If the safety unit 13 determines that the vehicle signal 11 meets the required criterion, the safety unit 13 as a whole ensures that the catch hook drive 10 actuates the catch hook 8 in the indicated direction of the arrow according to FIG. 1, therefore lifting it out of its engagement with the locking bolt 3 against the force of the spring. As a consequence of this, the hood comes free and can be completely opened.

However, if the safety unit 13 determines that the motor vehicle signal 11 does not meet the requirements for a release signal for the catch hook 10 to be generatable by the safety unit 13, the safety unit 13 either ensures that an electrical supply line for the catch hook drive 10 is galvanically isolated, or alternatively, it is also possible for the safety unit 13 to actuate the catch hook drive 10 to mechanically block the locking bolt 3 in the absence of a release signal.

Any malfunction of the locking mechanism 1,2 and/or the control unit 12 is ignored since the safety unit 13 is solely responsible for the actuation of the catch hook drive 10, taking priority over the control unit 12. Therefore, for example, if discrepancies are observed during the evaluation of the motor vehicle signal 11 and the redundant test by the control unit 12 and the safety unit 13, the safety unit 13 ensures, in each case and for safety reasons, that the electrical supply line to the catch hook drive 10 is galvanically isolated, or that the catch hook drive 10 is actuated to block the locking bolt 3. In each case, such malfunctions cause the locking bolt 3 to still be secured by means of the catch hook 8, and the associated hood cannot be completely opened. The catch hook drive 10 can be designed in two parts overall, with a first drive part which actuates the catch hook 8 in a clockwise direction to release the locking bolt 3 and another, second drive part which ensures that the catch hook 8 is blocked in the absence of a release signal from the safety unit 13. At the same time, a single drive can also be used at this juncture.

If, for example, there is an opening request from the luggage compartment by the opening signal 15 while the motor vehicle is driving, the control unit 12 ensures in this case that the locking mechanism 1,2 is opened, but the catch hook 8, however, still secures the locking bolt 3. Consequently, any person located in the luggage compartment receives breathing air through the gap created in this way between the hood and the vehicle body, and the hood remains secured as before and unchanged with the assistance of the catch hook 8. In this case, the control unit 12 interprets the opening signal 15 in a corresponding manner, and ignores the additional criterion of the vehicle speed or motor vehicle signal 11. Nonetheless, the safety unit 13 querying the motor vehicle signal 11 ensures, unchanged and as before, that the catch hook 8 is secured, in that either the electrical supply line to the catch hook drive 10 experiences an interruption, or the catch hook drive 10 blocks the catch hook 8.

LIST OF REFERENCE SIGNS

1 Rotary latch
2 Pawl

1,2 Locking mechanism
3 Locking bolt
4 Inlet opening
5 Hook
6 Extension
7 Stop surface
8 Catch hook
9 Locking mechanism drive
10 Catch hook drive
11 Motor vehicle signals
12 Control unit
13 Safety unit
14, 15 Opening signal

The invention claimed is:

1. A motor vehicle lock comprising:

a locking mechanism including a rotary latch and a pawl for interacting with a locking bolt, a catch hook for independent and additional securing of the locking bolt relative to the locking mechanism, wherein:

the locking mechanism is equipped with a locking mechanism drive and the catch hook is equipped with a catch hook drive, the locking mechanism drive and the catch hook drive are selectively actuated according to a motor vehicle signal, and the motor vehicle signal includes one or more of a motor vehicle speed, a motor vehicle brake signal, and a motor vehicle tilt signal, a control unit configured to control the locking mechanism drive and the catch hook drive, wherein the control unit is configured to evaluate the motor vehicle signal in response to the control unit receiving an opening signal, a safety unit independent from the control unit configured to independently control the catch hook drive, wherein the safety unit is configured to evaluate the motor vehicle signal in response to the control unit receiving the opening signal, and the control unit and the safety unit are configured such that the evaluation of the safety unit for actuating the catch hook drive takes priority over the evaluation of the control unit for actuating the catch hook drive when the control unit receives the opening signal; and wherein the safety unit is arranged in series between the control unit and the catch hook drive.

2. The motor vehicle lock according to claim 1, wherein the safety unit and the control unit simultaneously process the motor vehicle signal.

3. The motor vehicle lock according to claim 1, wherein the safety unit controls the catch hook drive to open the catch hook depending on the motor vehicle signal, or galvanically isolates an electrical supply line of the catch hook drive so that the catch hook cannot be opened.

4. The motor vehicle lock according to claim 1, wherein the catch hook drive is configured to open the catch hook and additionally to mechanically block the catch hook in the absence of a release signal.

5. The motor vehicle lock according to claim 1, wherein the locking mechanism drive is configured to open the locking mechanism by lifting the pawl out of the rotary latch.

* * * * *